(12) United States Patent
Sandholm

(10) Patent No.: US 6,272,473 B1
(45) Date of Patent: Aug. 7, 2001

(54) METHOD, APPARATUS, AND EMBODIED DATA STRUCTURES FOR OPTIMAL ANYTIME WINNER DETERMINATION IN COMBINATORIAL AUCTION-TYPE PROBLEMS

(76) Inventor: Tuomas Sandholm, 6951 Pershing Ave., University City, MO (US) 63130

( * ) Notice: Subject to any disclaimer, the term of this patent is extended or adjusted under 35 U.S.C. 154(b) by 0 days.

(21) Appl. No.: 09/179,659

(22) Filed: Oct. 27, 1998

(51) Int. Cl.[7] .................................................. G06F 15/30
(52) U.S. Cl. ............................ 705/37; 705/26; 705/27; 705/35
(58) Field of Search .................... 705/35, 37, 26

(56) References Cited

U.S. PATENT DOCUMENTS

| | | | |
|---|---|---|---|
| 5,406,476 | * 4/1995 | Deziel, Jr. et al. | 364/402 |
| 5,826,244 | * 10/1998 | Huberman | 705/37 |
| 5,835,896 | * 11/1998 | Fischer et al. | 705/37 |
| 5,886,902 | * 3/1999 | Turrini | 364/491 |
| 5,890,138 | * 3/1999 | Godin et al. | 705/26 |
| 5,905,974 | * 5/1999 | Fraser et al. | 705/37 |
| 5,905,975 | * 5/1999 | Ausubel | 705/37 |

OTHER PUBLICATIONS

Michael H. Rothkopf et al., "Computationally Manageable Combinational Auctions", Management Science, Aug. 1998, p. 1131–1147.*
Alexander Reinefeld et al, "Enhanced Iterative–Deepening Search", IEEE Transactions on Pattern Analysis and Machine Intelligence, Jul. 1994, p. 701–710.*
Curt Powley et al., "Single–Agent Parallel Window Search", IEEE Transactions on Pattern Analysis and Machine Intelligence, May 1991, p. 466–477.*

* cited by examiner

Primary Examiner—Robert W. Downs
Assistant Examiner—Jagdish Patel
(74) Attorney, Agent, or Firm—Webb Ziesenheim Logsdon Orkin & Hanson, P.C.

(57) ABSTRACT

Disclosed is a method and data structures for solution of problems of the class equivalent to optimal allocation determination in a combinatorial auction. The method stores bids in a binary tree which is searched in conjunction with a stopmask data structure which allows, in effect, parts of the binary tree to be instantly pruned during search and in place. Depth-first search in this tree can be done in place without an open list or recursive calls. The main search method operates via recursive call and generates each allocation of positive value once but does not generate others.

21 Claims, 9 Drawing Sheets

METHOD, APPARATUS, AND EMBODIED DATA STRUCTURES FOR OPTIMAL ANYTIME WINNER DETERMINATION IN COMBINATORIAL AUCTION-TYPE PROBLEMS

BACKGROUND OF THE INVENTION

1. Field of the Invention

The invention relates to solution of problems of the class equivalent to optimal allocation determination in a combinatorial auction.

2. Background

In sequential auctions, the items are auctioned one at a time. If an agent has preferences over bundles (combinations of items), then bidding in such auctions is difficult. To determine one's valuation for an item, one needs to guess what items one will receive in later auctions. This requires speculation of what the others will bid in the future. This introduces uncertainty and computational cost, both of which reduce the efficiency. Furthermore, in auctions with a reasonable number of items, the lookahead becomes intractable, and there is no easy way to bid rationally. Therefore, the future uncertainties of sequential auctions result in inefficiencies making it difficult for rational agents to bid.

An alternative to sequential auctioning of the interdependent items would be to open them all for auction in parallel. However, some of the same problems prevail. For example, when bidding for an item, the bidder does not know its valuation because it depends on which other items the bidder wins, which in turn depends on how others will bid (in sealed-bid auctions this is not known to the bidder, and in open-cry auctions it may become known only later). In parallel auctions, an additional difficulty arises: each bidder would like to wait until the end to see what the going prices will be. If each bidder plans to wait until the end, bidding will not commence. Therefore, parallel auctions also have future uncertainties that result in inefficiencies.

One solution to this problem is to allow the bidders to place bids for combinations of items instead of only on individual items. This is an auction protocol known as a "combinatorial auction". Determining the winning bids in a combinatorial auction, however, in a way that maximizes the auctioneer's revenue is intractable (NP-complete).

There are situations involving the exchange of items for value in which there may exist synergies in the preferences for combinations of the items. A common situation in which this is found is in a combinatorial auction. In this situation an auctioneer holding properties wishes to maximize the value obtained through the auction of the properties. Bidders may have a willingness to exchange more value for combinations of properties than they would for individual elements of the combination, if considered alone and aggregated. For example, if A, B, C, D, and E were adjacent parcels of land along the bank of a river, and a bidder had a willingness to pay for parcel A alone, say P1; for parcel B, alone, say P2; and for parcel C alone, say P3, the bidder may have a greater willingness to pay for the combination of the three adjacent parcels {A, B, C} than P1+P2+P3. This synergistic or superadditive effect may be bidder-specific. This effect may also be present in a reverse auction context where buyers are the auctioneers, for example, where portions of a construction contract are offered to be bid upon by construction contractors.

To the auctioneer, it is then desirable, to structure an auction to allow bidder to bid in combinations to gain the value of their synergies. Similarly, it is desirable for bidders to be able to bid on combinations. A bidder may be unwilling to bid more than the sum of his or her willingnesses to pay for individual properties and thus have to forgo the opportunity to reap the synergistic gains. Alternatively, a bidder may be exposed to risk by overbidding in an eventually unsuccessful attempt to obtain a combination of properties.

Conventionally, practical implementations of the class of situations involving superadditive preferences, for example a combinatorial auction, have proven difficult because of the complexity of considering numerous possible combinations of bids for items. Given the complexity of the calculations, a computer or equivalent device is a virtual necessity to perform the task. Conventionally, computer-implemented methods of selecting winning bids in a combinatorial auction involve representing the items and bids in a computer or equivalent and performing particular operations on this data to determine winning bids. However, conventional methods are impractical for many applications.

Winner determination in combinatorial auctions means choosing which bids to accept so as to maximize the sum of the prices of the accepted bids (under the constraint that each item can be given out only once, i.e. bids that overlap in items cannot be accepted together). This is the same problem as the abstract combinatorial problem called weighted set packing. The fact that weighted set packing is NP-complete means that there is no polynomial time (in the number of bids placed) algorithm for finding a revenue maximizing allocation in combinatorial auctions—unless the complexity class NP equals the complexity class P which is extremely unlikely. Generally, the number of possible allocation is $O(\#item^{(\#items)})$ and $\omega(\#item^{(\#items/2)})$, so exhaustive search is impractical unless the number of auctioned items is very small (less than about 15 using conventional techniques).

One conventional approach to optimal winner determination involves dynamic programming. However, this method requires $\Omega(2^{\#items})$ and $O(2^{(2\#items)})$ operations independent of the numbers of the bids that have actually been placed. This method does not capitalize on the common situation that, in fact, most combinations will not have bids placed on them. This means that the algorithm will not scale well past about 20–30 items even if very few bids have been placed.

Another conventional approach is to compromise optimality of the solution. Such approaches try to construct algorithms that run in polynomial time in the number of bids, and guarantee that the solution is within a bound from optimal. However, there is a strong recent inapproximability result by Håastad that guarantees that no polynomial time algorithm can guarantee that the solution is within a bound of $\#bids^{(1-\epsilon)}$ or better for any $\epsilon>0$−(unless NP=probabilistic P which is very unlikely). Other conventional approaches try to devise polynomial time approximation schemes for special cases, but in these approaches, the solution quality guarantees are so weak as to be impractical in the auction application.

Yet another conventional approach is to place severe restrictions on which combinations may be bid upon. However, such restrictions can lead to inefficient outcomes because the bidders are faced with similar uncertainties as in bidding for interrelated items individually.

Thus it would be desirable to have a method and apparatus for optimal winner determination in combinatorial auction-type problems that does not require exponential time or memory; can capitalize on the fact that most combinations will not have bids placed on them in practice; does not compromise on the optimality of the solution; is not limited to special cases; and does not place restrictions on what combinations may be bid upon. It would be further desirable to have such a method that could operate as an anytime algorithm.

SUMMARY

To provide these and other desired features, the present invention is directed towards a computer-implemented method for optimally selecting sets of items, by receiving a plurality of sets of items having associated valuations, storing said plurality of sets in a data structure configured for searching based on the inclusion/exclusion of items, creating candidate allocations of said sets, said candidate allocations created by repeatedly searching said data structure for a set containing an item wherein successive searches exclude items already present in said candidate allocation, and selecting a candidate allocation comprising disjoint sets having an optimal combination of associated valuations.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Description of Figures

Figure 1:
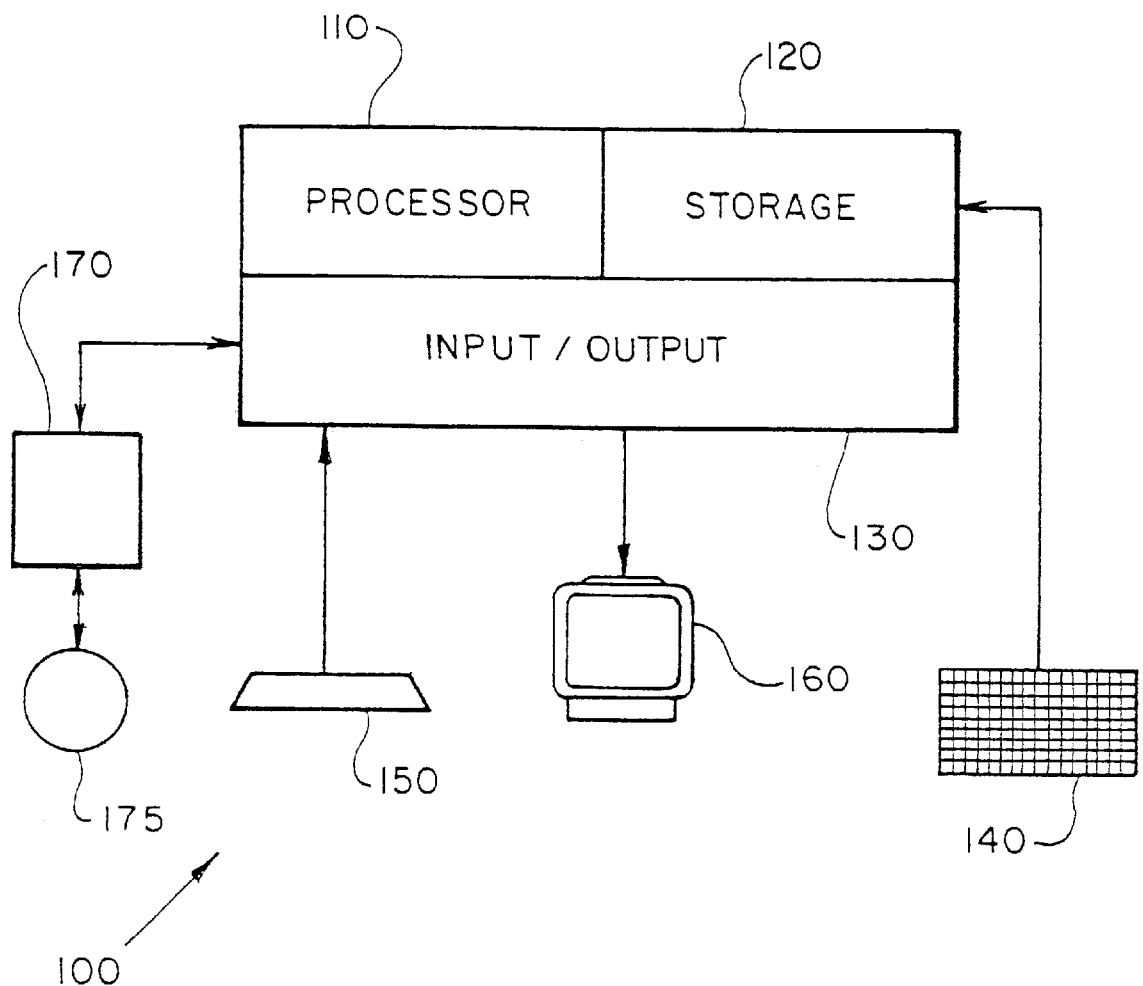
FIG. 1 depicts a computer system capable of being configured to embody aspects of the invention in accordance with an illustrative embodiment.

While this invention is susceptible of embodiment in many different forms, there is described herein in detail an illustrative embodiment with the understanding that the present disclosure is to be considered as an example of the principles of the invention and is not intended to limit the invention to the embodiment illustrated.

In general, however, the present invention may be applied to a class of computing problems computationally equivalent to the problem of optimal allocation determination in combinatorial auctions. For example, the present invention may be applied to the weighted set packing problem where a set is a combination of items and a weight is a bid price. Another equivalent problem is the coalition structure generation in characteristic function games problem. There items could be agents and coalitions combinations of agents. Bid prices would be values of coalitions; an allocation could be a coalition structure where it is desired to find the structure that maximized a sum of the values of the coalition. Still another equivalent problem (after removal of dominated bids as described below) is the weighted independent set problem. In the weighted independent set problem, a graph with vertices and edges, the vertices having associated weights, is identified and an independent set is a collection of vertices such that no two vertices are connected. Solution of the problem involves finding an independent set with the maximum sum of the weights associated with the vertices. Yet another application of the present invention is to the weighted maximum clique problem. As above a graph having weighted vertices is identified and solution of the problem involves finding a clique with the highest sum of the weights of member vertices. The weighted maximum clique problem may be reduced to the weighted independent set problem by taking the complement graph. The present invention may then be applied to solve the weighted independent set problem. One skilled in the art will recognize many problems that can be converted to the weighted independent set problem by appropriate reductions for solution with the present invention. More generally, the present invention may be applied to any NP complete problem by converting it to a weighted set packing problem, and applying the present invention to the weighted set packing problem.

More particularly, the present invention provides a method and apparatus for determining the winners in combinatorial auctions. The present invention may be used to find the optimal solution to a combinatorial auction. If a method in accordance with the present invention is terminated before it has completed, it will still have a feasible solution in hand at any time, and this feasible solution improves monotonically, the more time that is allocated to the method.

An approach of the present invention for optimal winner determination is to allow all combinations to be bid on, and to capitalize on the space of bids being necessarily extremely sparsely populated in practice. For example, even if there are only 100 items to be auctioned, there are (2^100)-1 combinations, and it would take an inordinate amount of time to bid on all of them. Sparseness of bids implies sparseness of the allocations that actually need to be checked. There is described herein a method that constructively checks each allocation that has nonzero value exactly once, and does not construct allocations that have zero value. Therefore, unlike dynamic programming, this method only generates those parts of the search space which are actually populated by bids.

FIG. 1 depicts a computer system 100 capable of embodying aspects of the invention. Shown are a microprocessor 110, a storage 120 and an input/output system 130. The storage 120 is capable of being configured to provide a data structure 140 which may contain data manipulated by the computer system 100 when embodying aspects of the invention. Further illustrated is a media drive 170, such as a disk drive, CD-ROM drive, or the like. The media drive 170 may operate with a computer-usable storage medium 175 capable of storing computer-readable program code able to configure the computer system 100 to embody aspects of the invention. The input/output system 130 may also operate with a keyboard 150 or a display 160. One skilled in the art will recognize numerous structures of programmed or programmable logic capable of being configured to embody aspects of the invention.

In the illustrative embodiment of the invention, computer program code configures a computer to embody aspects of the invention. So configured, representations of physical quantities and characteristics are manipulated through a series of operations to achieve a method, apparatus, and embodied data structures for optimal anytime winner determination in combinatorial auction-type problems. One skilled in the art will appreciate the distinction between the manipulation of physical quantities and representations thereof within a computer and will quickly apprehend when reference is being made to one or the other.

The computer system 100 may be a networked computer and in one embodiment, communicates with other computers over a network. In one embodiment the invention is used to conduct electronic commerce in a networked computing environment. In a more preferred embodiment, the networked computing environment is the internet.

Figure 2:
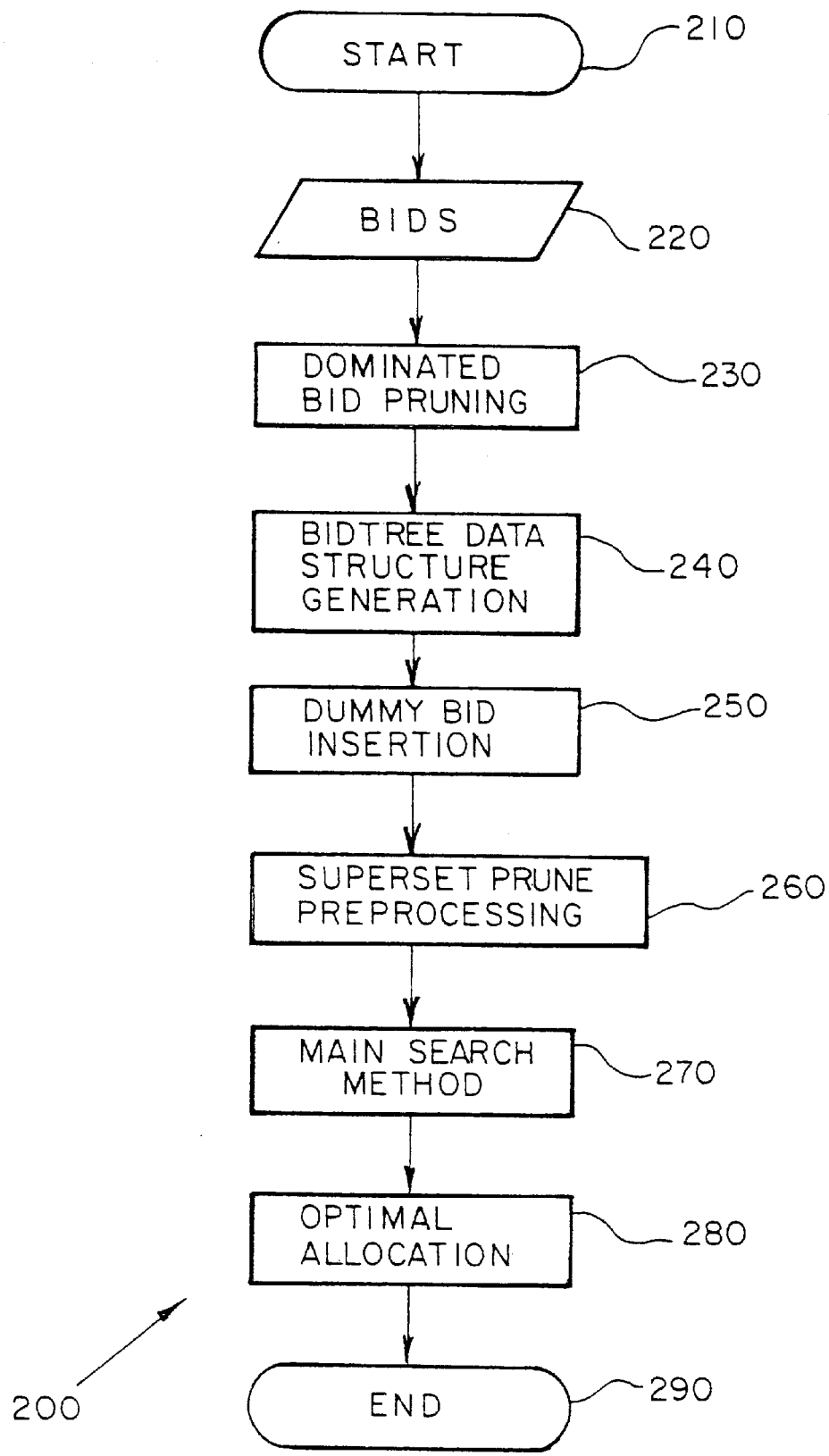
FIG. 2 depicts a method for optimal anytime winner determination in combinatorial auction-type problems in accordance with an illustrative embodiment.

An overview of the illustrative embodiment may be provided with reference to FIG. 2. Depicted there is a 'winner determination' method 200. Processing initiates at a 'start' terminal 210 and continues to a 'bids' data block 220 where a plurality of bids are received. In the illustrated embodiment, a bid is a set of items with an associated price and identity of the bidder.

Next, a 'dominated bid pruning' process 230 removes from further consideration dominated bids. A bid for a set of items is dominated when there exists another bid for the same
set of items at a higher bid price. In other words, bids that are placed on a combination for which a higher bid has also been placed are deleted.

Then, a 'Bidtree Data Structure generation' 240 generates a Bidtree data structure with the remaining bids from the 'bids' data block 220 after pruning by the 'dominated bid pruning' process 230. A 'dummy bid insertion' process 250, then inserts into the Bidtree data structure bids for all single items for which there are not already bids; these bids are given a price of $0. Additional aspects of the Bidtree data structure are described with reference to FIG. 3A.

Next, a 'superset prune preprocessing' process 260 examines the bids individually to determine whether there are combinations of disjoint subsets of the items in the bid, the sum of whose bid prices is greater than, or equal to, the bid. These bids are pruned from the Bidtree data structure. This process is discussed in greater detail with reference to FIG. 7 and FIG. 8.

A 'main search' method 270 then executes which determines the optimal allocation. The optimal allocation refers to which bids should be accepted by an auctioneer seeking to maximize revenue from an auction. These bids would be the winning bids in a combinatorial auction in accordance with an illustrative embodiment. The 'main search' method 270 is described in greater detail with reference to FIG. 5. An 'optimal allocation' data block 280 returns the optimal allocation and processing completes through an 'end' terminal 290.

Greater detail of aspects of the illustrative embodiment outlined in FIG. 2 will now be provided.

Figure 3A:
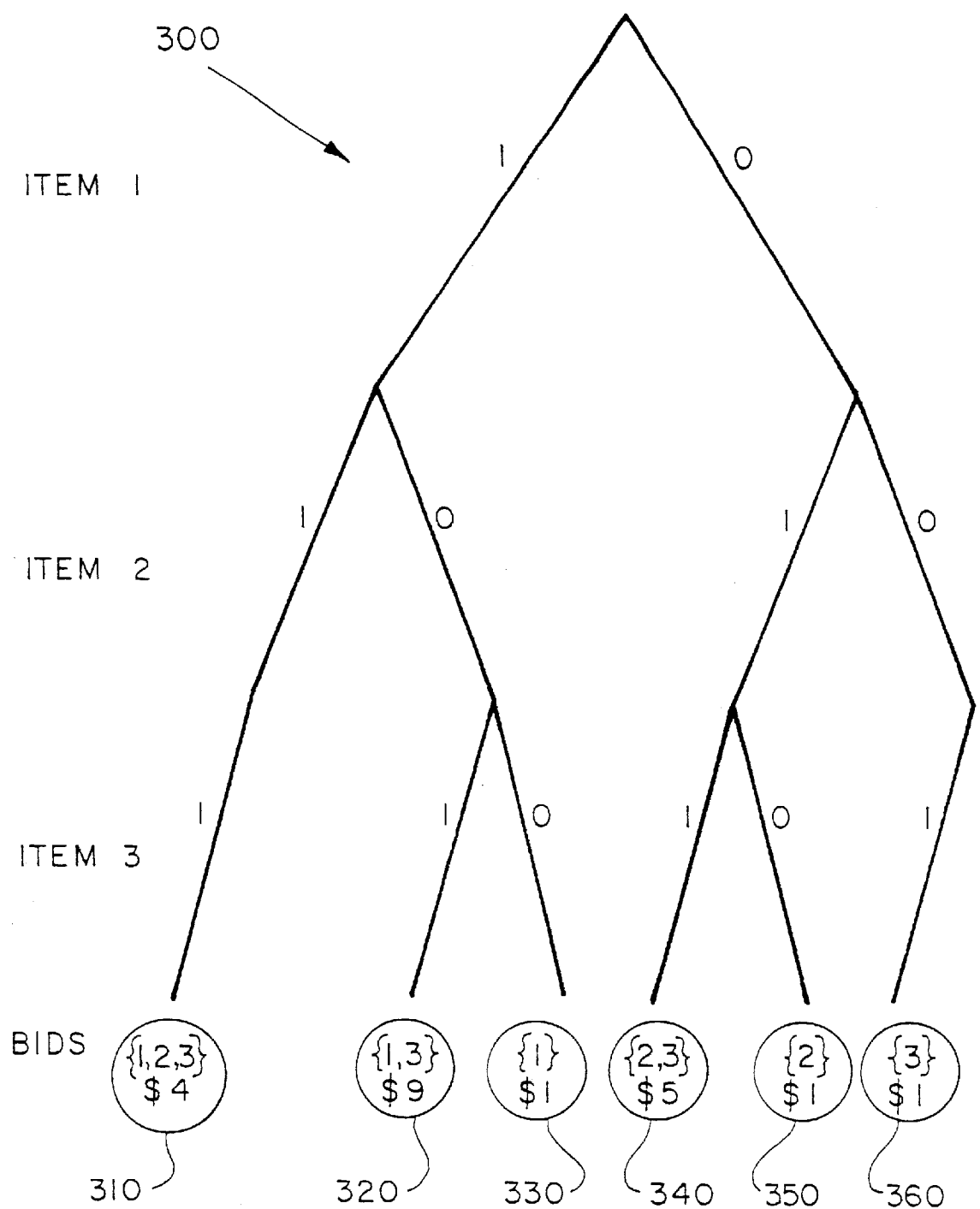
FIG. 3A depicts a Bidtree data structure in accordance with an illustrative embodiment.

FIG. 3A illustrates a Bidtree data structure 300 in accordance with an illustrative embodiment. The Bidtree data structure 300 may be embodied in a computer readable medium, such as a memory, e.g., storage 120. As one of skill in the art recognizes, when a computer-readable medium, such as a memory, is configured to embody the Bidtree data structure 300, structure is imposed on the computer-readable medium. The Bidtree data structure 300 shown in FIG. 3A is one example of a Bidtree data structure; one skilled in the art will quickly realize the invention is not limited to the one illustrated. Further, while the illustrated embodiment uses the term "Bids" and "Bidtree" one skilled in the art will recognize these terms as exemplars of an application of the aspects of the invention to a combinatorial auction in accordance with the illustrated embodiment. From the disclosure herein, one of skill will understand how aspects of the invention including the Bidtree data structure may be applied in other contexts of the same class as the combinatorial auction problem.

Now, in further detail, the Bidtree data structure 300 is a data structure configured as a binary tree. There is one level in the Bidtree data structure 300 for each item in an auction. In the illustrated embodiment, the items are numbered and the level of the tree corresponds to the number of the item. As can be seen, the first level of branching corresponds to item 1, the second to item 2, and the third to item 3. More generally, the number of levels of the tree correspond to the number of items.

Bids, i.e., combinations of items and associated prices, are represented as leaves of the Bidtree data structure 300. The inclusion of an item in a bid corresponds to a direction of branching at the level of the tree corresponding to that item. Shown in FIG. 3A are a first bid 310 consisting of items {1,2,3}, a second bid 320 consisting of items {1,3}, a third bid 330 consisting of item {1}, a fourth bid 340 consisting of items {2,3}, a fifth bid 350 consisting of item {2}, and an sixth bid 360 consisting of item {3}. As shown, the presence of an item in a bid corresponds to the left-branch at that level of the tree, and exclusion correspond to the right branch at that level of the tree. One of skill will appreciate the particular direction of branching is not fundamental to the present invention. Illustrated along the branches of the tree and ones (1s) and zeroes (0s). These represent inclusion and exclusion, respectively. Entry of a bid in the Bidtree data structure 300 thus corresponds to following the inclusion branches at levels corresponding to items in the bid and the exclusion branches at levels corresponding to items not in the bid. Search for a bid or a bid containing an item in the Bidtree data structure 300 is analogous: inclusion branches are taken at the levels corresponding to items included in what is being searched for and exclusion branches are taken at levels corresponding to items not included in what is being searched for. One of skill will be familiar with many features of use of a binary tree which may be applied to the Bidtree data structure 300.

Figure 4:
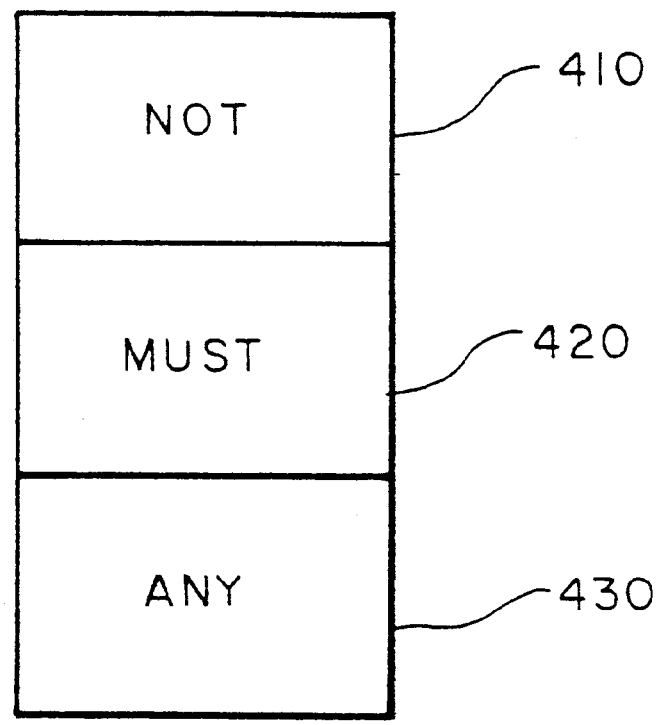
FIG. 4 depicts a Stopmask data structure in accordance with an illustrative embodiment.
Figure 4:
Figure 4:
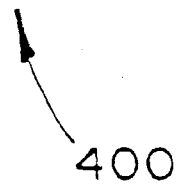

FIG. 4 illustrates a Stopmask data structure 400. The Stopmask data structure 400 is used with a Bidtree data structure such as the Bidtree data structure 300 in the illustrative embodiment. The Stopmask data structure 400 may be embodied in a computer-readable medium such as a memory, e.g., storage 120. As one of skill in the art recognizes, when a computer-readable medium, such as a memory, is configured to embody the Stopmask data structure 400, structure is imposed on the computer-readable medium.

In the illustrative embodiment, the Stopmask data structure 400 is a vector stored in memory with one variable for each auctioned item. Thus, were there N items, there would be N variables in the Stopmask data structure 400. Each variable may take one of three values: 'NOT', 'MUST', or 'ANY'. A Stopmask data structure such as the Stopmask data structure 400 may be used in conjunction with a Bidtree data structure to increase the efficiency of a search of the Bidtree data structure. Recall that levels in the Bidtree data structure 300 correspond to items. Similarly, variables in the Stopmask data structure 400 correspond to items. The values of the variables corresponding to an item in the Stopmask data structure 400 aid in reducing a search of the Bidtree data structure 300. If an item's variable takes on the value 'NOT', in effect all parts of the Bidtree data structure are pruned in place as it indicates that a search of the Bidtree data structure should not follow branches which include that item, thus temporarily eliminating bids containing that item from being considered. If the item's variable takes on 'MUST' then all other parts of the Bidtree data structure are in effect pruned as only branches which include that item are followed. If an item's variable take on 'ANY', then no restrictions are placed on a search in the Bidtree data structure with respect to that item.

Shown in FIG. 4 are a first variable 410 corresponding to Item 1 and having the value of 'NOT', a second variable 420 corresponding to Item 2 and having value 'MUST', a third variable 430 corresponding to an Item 3 and having value 'ANY', and an Nth variable 440 corresponding to an Item N and having value 'ANY'.

Figure 5:
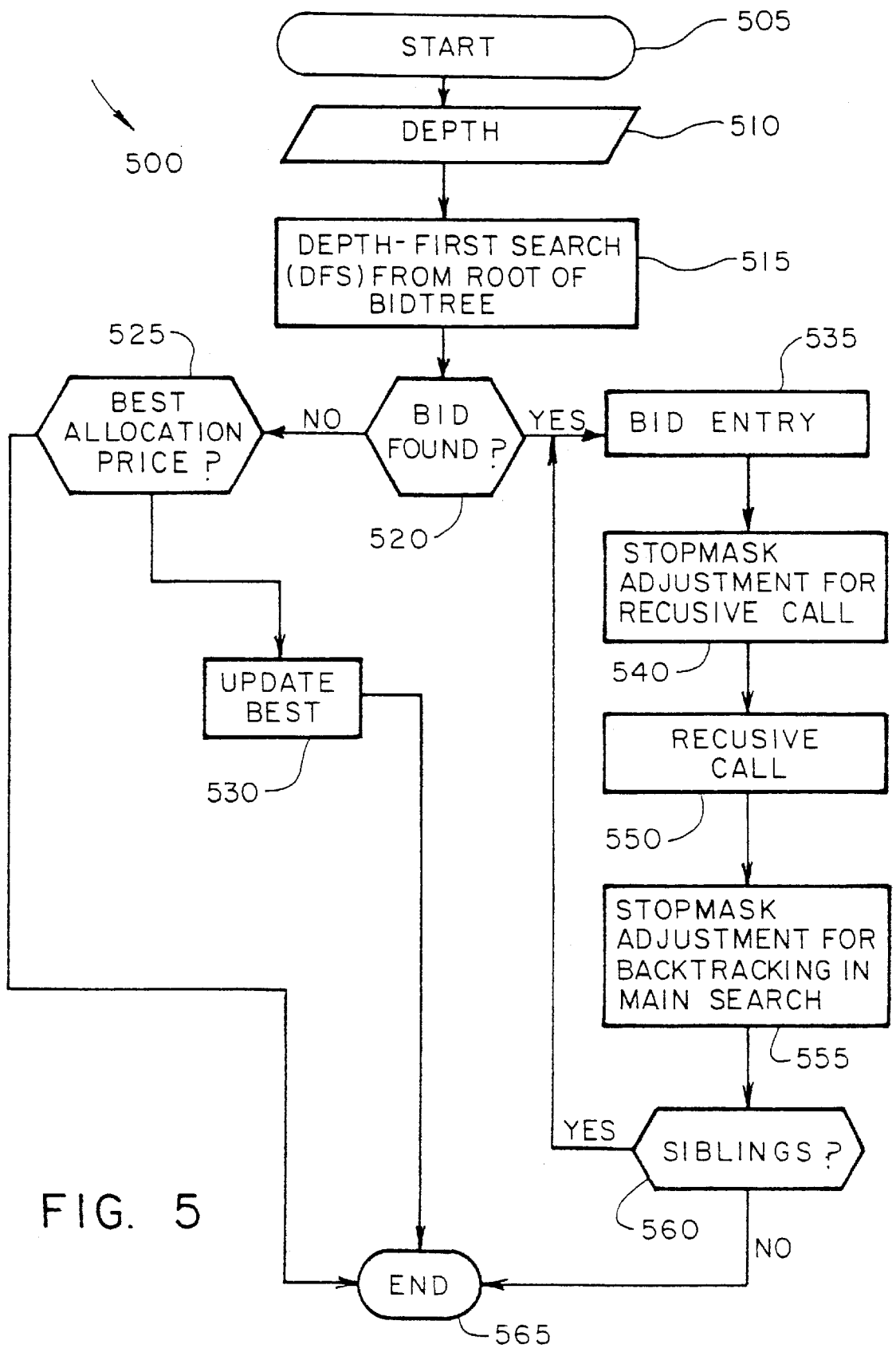
FIG. 5 depicts a 'main search' method in accordance with an illustrative embodiment.

FIG. 5 illustrates a main search method 500. The main search method 500 uses two interleaved depth-first searches (DFS). One is the main search method 500 and the other occurs in the Bidtree data structure and searches what bid to add next to a search path generated by the main search method 500. The main search method 500, in effect, generates a main search tree as described with reference to FIG. 3B and FIG. 6, however in the illustrative embodiment, the main search method 500 does not store the main search tree in memory. In the illustrated embodiment, only the bids corresponding to one branch of the main search tree are stored. They are stored in a global data structure, an N-vector (not shown), where N corresponds to the number of items, and wherein each element of the vector contains a pointer to a bid in the Bidtree data structure. As bids comprising a search path, i.e., an allocation, are generated they are stored in the N-vector and when backtracking and re-branching in the main search method 500 the N-vector is adjusted to substitute pointers to bids accordingly.

The main search method 500 operates recursively. Before the first call to the main search method 500 the Stopmask data structure is initialized; the first element of the Stopmask data structure is initialized to 'MUST' and remaining elements of the Stopmask data structure are initialized to 'ANY'. In addition, the main search method 500 is provided with the location of the Bidtree data structure. In one embodiment the Bidtree data structure is stored globally. A feature of the invention is that the depth-first search of the Bidtree data structure occurs in place;

no open list or recursive call is required, and a pointer providing information of where the search focus is and knowledge of the previous direction suffice to conduct the search.

Processing initiates at a 'start' terminal 505 and continues to receive a 'Depth' data block 510. The main search method 500 is passed as a parameter a depth. The depth refers to the position in the N-vector where this call of the main search method 500 should enter a bid it locates. Every time a node is to be added to the path in the main search method, a depth-first search is begun at the root of the Bidtree data structure; new siblings are generated in the main search method 500 by backtracking in the search of the Bidtree data structure. When going deeper the main search method 500, the depth is increased and when backtracking in the main search method 500 the depth is decreased.

Next a 'Depth-First Search from Root of Bidtree data structure' process 515 begins which uses the Stopmask data structure to conduct a depth-first search of the Bidtree data structure for a bid. The Stopmask data structure allows an efficient search of the Bidtree data structure to occur.

If an item's variable takes on the value 'NOT', in effect, all parts of the Bidtree data structure are pruned in place as it indicates in the DFS of the Bidtree data structure to not follow branches which include that item, thus temporarily eliminating bids containing that item from being considered. If the item's variable takes on 'MUST' then all other parts of the Bidtree data structure are in effect pruned as only branches which include that item are followed.

Next a 'Bid Found' decision process 520 exits through its 'no' branch if the 'Depth-First Search from Root of Bidtree data structure' process 515 returned no bid. This will occur, for example, when all items are already in bids on the path. That is, if no bid is found it indicates the path is complete and processing enters a 'Better Allocation Price' decision process 525.

A variable stores a running total of the sum of the prices of the bids on the path. The 'Better Allocation Price' decision process 525 compares the running total with a best allocation price stored in memory (not shown). If the running total of the prices of the bids of the current path is greater than the best previously found, the best allocation price is updated and the current path stored by an 'Update Best' process 530. As one of skill can appreciated, this feature allows the main search method to be used as an anytime algorithm as the best allocation price will contain a monotonically improving allocation. In one embodiment of the invention, a temporal limit is placed on the length of time allocated for the main search method to search. Next, or if the 'Better Allocation Price' decision process 525 exits through its 'no' branch processing completes for this particular call through an 'end' terminal 565.

When a bid is found by the 'Depth-First Search from Root of Bidtree data structure' process 515, a 'Bid Entry' process 535 enters a pointer to the bid in the N-vector at the depth received from the 'Depth' data block 510. In addition, the price of the bid is added to the running total of the prices of the bids on the path. As stated above, in the illustrated embodiment the main search method 500 uses a depth-first search and since a bid has been found a recursive call of the main search method 500 will be made. A 'Stopmask data structure Adjustment for Recursive Call' process 540 sets variables in the Stopmask data structure corresponding to items in the bid entered by the 'Bid Entry' process 535 to 'NOT'. In addition, the item with the lowest index (i.e., lowest numbered item in the illustrated embodiment) that is not present in a bid already a member of the path is set to 'MUST'. In the illustrative embodiment, the variable to be set to 'MUST' is located as follows. If there are one or more intervals between items in the bid entered by the 'Bid Entry' process 535, for example, the items in the bid were {1, 4, 10}, the intervals are looped through until the first variable in the Stopmask data structure set to 'ANY' is found and this is set to 'MUST'. If there are no intervals between the items in the bid, or if all intervals have been examined without a variable set to 'ANY' having been located, values after the bid with the highest index are searched through until first variable in the Stopmask data structure set to 'ANY' is located and it is set to 'MUST'. If the end of the Stopmask data structure is reached, nothing is set to 'MUST'. In the illustrative embodiment, this information is not used to backtrack, although one of skill will quickly apprehend how it could be so used.

Next, a 'Recursive Call' 550 of the main search method 500 is made. The depth variable passed to the 'Recursive Call' 550 one greater than that received in the 'Depth' data block 510. When the 'Recursive Call' 550 completes, it indicates that, ultimately, the end of a path has been reached and that the main search method 500 should backtrack one bid on the path and search for siblings for the bid entered by the 'Bid Entry' process 535. A 'Stopmask data structure Adjustment for Backtracking in Main Search' process 555 executes. As a bid is backtracked in the main search method 500, variables in the Stopmask data structure corresponding to items in the bid entered by the 'Bid Entry' process 535 are changed back to 'ANY' as well as the variable of the Stopmask data structure that was set to 'MUST'. Recall that the N-vector contains a pointer to the location in the Bidtree data structure of the bid entered by the 'Bid Entry' process 535. The variable which is next set to 'MUST' is found by a search based on items in the bid entered by the 'Bid Entry' process 535. The process examines the items in the bid. The item in the bid with the smallest index has its corresponding variable in the Stopmask data structure set to 'MUST' and the remaining variables in the Stopmask data structure are set to 'ANY'.

Next, siblings for the bid entered by the 'Bid Entry' process 535 are sought by continuing the search of the Bidtree data structure begun by the 'Depth-First Search from Root of Bidtree data structure' process 515. Recall that when a new level is generated by the main search method 500 a search from the root of the Bidtree data structure is begun, but that when a sibling is generated in the main search method 500, only backtracking in the Bidtree data structure occurs. The search of the Bidtree data structure is resumed with the adjusted Stopmask data structure and if a sibling is found, a 'Siblings of Bid' decision process 560 exits through its 'yes' branch to enter this bid with the 'Bid Entry' process 535 and make another recursive call of the main search method 500. If the resumed search of the Bidtree data structure locates no siblings, the 'Siblings of Bid' decision process 560 exits through its 'no' branch and processing for this call of the main search method 500 completes through the 'end' terminal 565.

Figure 3B:
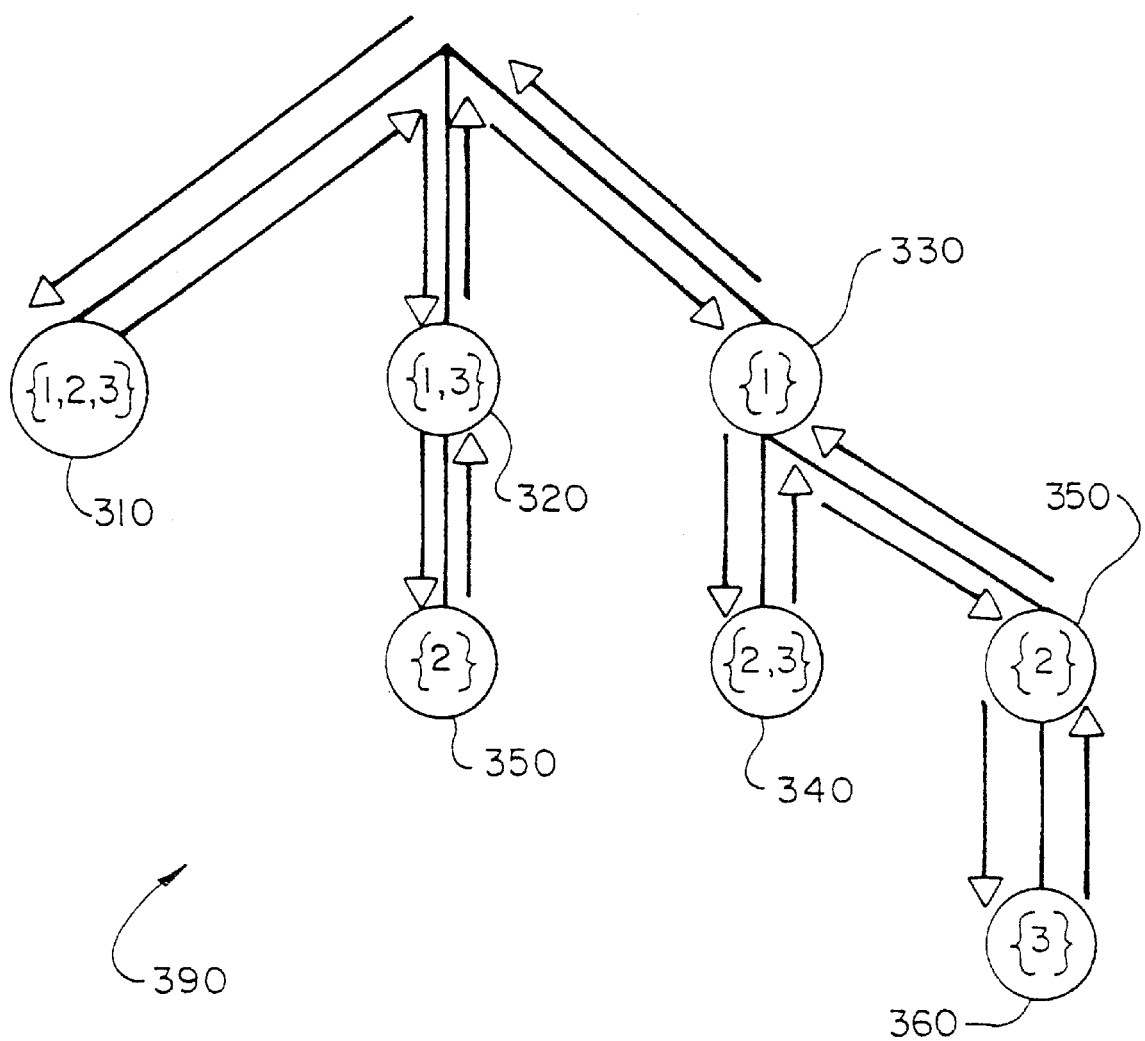
FIG. 3B depicts first main search tree corresponding to FIG. 3A in an illustrative embodiment.

An overview of the operation of the main search method 500 can now be provided making reference to FIG. 3A and FIG. 3B. As described below, the main search method 500 will be applied to the Bidtree data structure 300. A first main search tree 390 illustrates how bids in the Bidtree data structure 300 are examined. Recall that in accordance with the illustrative embodiment, the entirety of the first main search tree 390 need not be stored at any one time, only one branch.

The first call to the main search method 500 is made with depth=zero and a Stopmask of [1=MUST, 2=ANY, 3=ANY]. A depth-first search is begun of the Bidtree data structure which locates the first bid 310 {1,2,3}. This bid is entered at place zero in the N-vector and its price $4 added to the running total. The Stopmask data structure adjusted to [1=NOT, 2=NOT, 3=NOT]. The depth is increased and a recursive call is made. This recursive call finds no bids in the Bidtree data structure. Since $4 is the best price found thus far, it is entered as the best allocation price and the path consisting of the first bid 310 {1,2,3} is updated as the best path. This recursive call completes.

Returning to the calling process, the Stopmask data structure is adjusted to [1=MUST, 2=ANY, 3=ANY] and the main search backtracks the first bid 310 {1,2,3}. The depth is decreased and its price of $4 is decreased from the running total, bringing it to $0. Siblings for this bid are now sought by resuming the depth-first search in the Bidtree data structure. The search in the Bidtree data structure backtracks and locates the second bid 320 {1,3}. This bid is entered at place zero in the N-Vector and its price of $9 added to the running total for this path, bringing it to $9. The Stopmask data structure is adjusted to [1=NOT, 2=MUST, 3=NOT], the depth increased and a recursive call is made. A new search from the root of the Bidtree data structure finds the fifth bid 350 {2} which is entered at place 1 in the N-vector and the price of $1 added to the running total, bringing it to $10. The Stopmask data structure is adjusted to [1=NOT, 2=NOT, 3=NOT], the depth increased and a recursive call is made. This recursive call finds no bids in the Bidtree data structure. Since the running total for this path is $9+$1=$10 is replaces $4 as the best allocation price and this path is stored as the best path. This recursive call completes.

Returning to the calling process, the Stopmask data structure is adjusted to [1=NOT, 2=MUST, 3=NOT] and the main search backtracks the fifth bid 350 {2}. The depth is decreased and its priced decreased from the running total, bringing it to $9. Siblings for this bid are now sought by resuming the depth first search in the Bidtree data structure. The search in the Bidtree data structure backtracks and is unable to locate any bids. This recursive call completes.

Returning to the calling process, the Stopmask data structure is adjusted to [1=MUST, 2=ANY, 3=ANY] and the main search backtracks the second bid 320 {1,3}. The depth is decreased and its price is decreased from the running total, bringing it to $0. Siblings for this bid are now sought by resuming the depth-first search in the Bidtree data structure. The search in the Bidtree data structure backtracks and locates the third bid 330 {1}. This bid is entered at place zero in the N-vector and its price of $1 added to the running total, bringing it to $1. The Stopmask data structure is adjusted to [1=NOT, 2=MUST, 3=ANY]. The depth is increased and a recursive call is made. A new search from the root of the Bidtree data structure finds the fourth bid 340 {2,3} which is entered at place 1 in the N-vector and the price of $5 added to the running total, bringing it to $6. The Stopmask data structure is adjusted to [1=NOT, 2=NOT, 3=NOT], the depth is increased and a recursive call is made. This recursive call finds no bids in the Bidtree data structure. Since the running total for this path is $5+1=6 which is less than the currently best allocation price of $10, this recursive call completes.

Returning to the calling process, the Stopmask data structure is adjusted to [1=NOT, 2=MUST, 3=ANY] and the main search backtracks the fourth bid 340 {2,3}. The depth is decreased and the price is decreased from the running total, bringing it to $1. Siblings for this bid are now sought by resuming the depth-first search in the Bidtree data structure. The search in the Bidtree data structure backtracks and locates the fifth bid 350 {2}. This bid is entered at place one in the N-vector and its price of $1 added to the running total, bringing it to $2. The Stopmask data structure is adjusted to [1=NOT, 2=NOT, 3=MUST]. The depth is increased and a recursive call is made. A new search from the root of the Bidtree data structure finds the sixth bid 360 {3} which is entered at place two in the N-vector and the price of $1 added to the running total, bringing it to $3. The Stopmask data structure is adjusted to [1=NOT, 2=NOT, 3=NOT], the depth is increased and a recursive call is made. This recursive call finds no bids in the Bidtree data structure. Since the running total for the path is $1 +$1+$1=3 which is less than the currently best allocation of $10, this recursive call completes.

Returning to the calling process, the Stopmask data structure is adjusted to [1=NOT, 2=NOT, 3=MUST] and the main search backtracks the sixth bid 360 {3}. The depth is decreased and its price decreased from the running total, bringing it to $2. Siblings for this bid are now sought by resuming the depth first search in the Bidtree data structure. The search backtracks but finds no bids. This recursive call completes.

Returning to the calling process, the Stopmask data structure is adjusted to [1=NOT, 2=MUST, 3=ANY] and the main search backtracks the fifth bid 350 {2}. The depth is decreased and its price decreased from the running total, bringing it to $1. Siblings for this bid are now sought by resuming the depth first search in the Bidtree data structure. The search backtracks but finds no bids. This recursive call completes.

Returning to the calling process, the Stopmask data structure is adjusted to [1=MUST, 2=ANY, 3=ANY] and the main search backtracks the third bid 330 {1}. The depth is decreased and its price decreased from the running total, bringing it to $0. Siblings for this bid are now sought by resuming the depth first search in the Bidtree data structure. The search backtracks but finds no bids. This recursive call completes, completing the main search method. The best allocation price of $10 remains stored along with its path of [{1,3}, {2}] and the identity of the bidder of each of the bids in the winning allocation.

For illustration, the embodiment of the invention just described indicated that, when backtracking in the main search method, the best allocation price was decreased by the bid price of the bid being backtracked. In other embodiments of the invention, the best allocation price is passed as a parameter to the main search method which, upon completion of recursive calls, retains the appropriately reduced best allocation price of the calling process.

Figure 6:
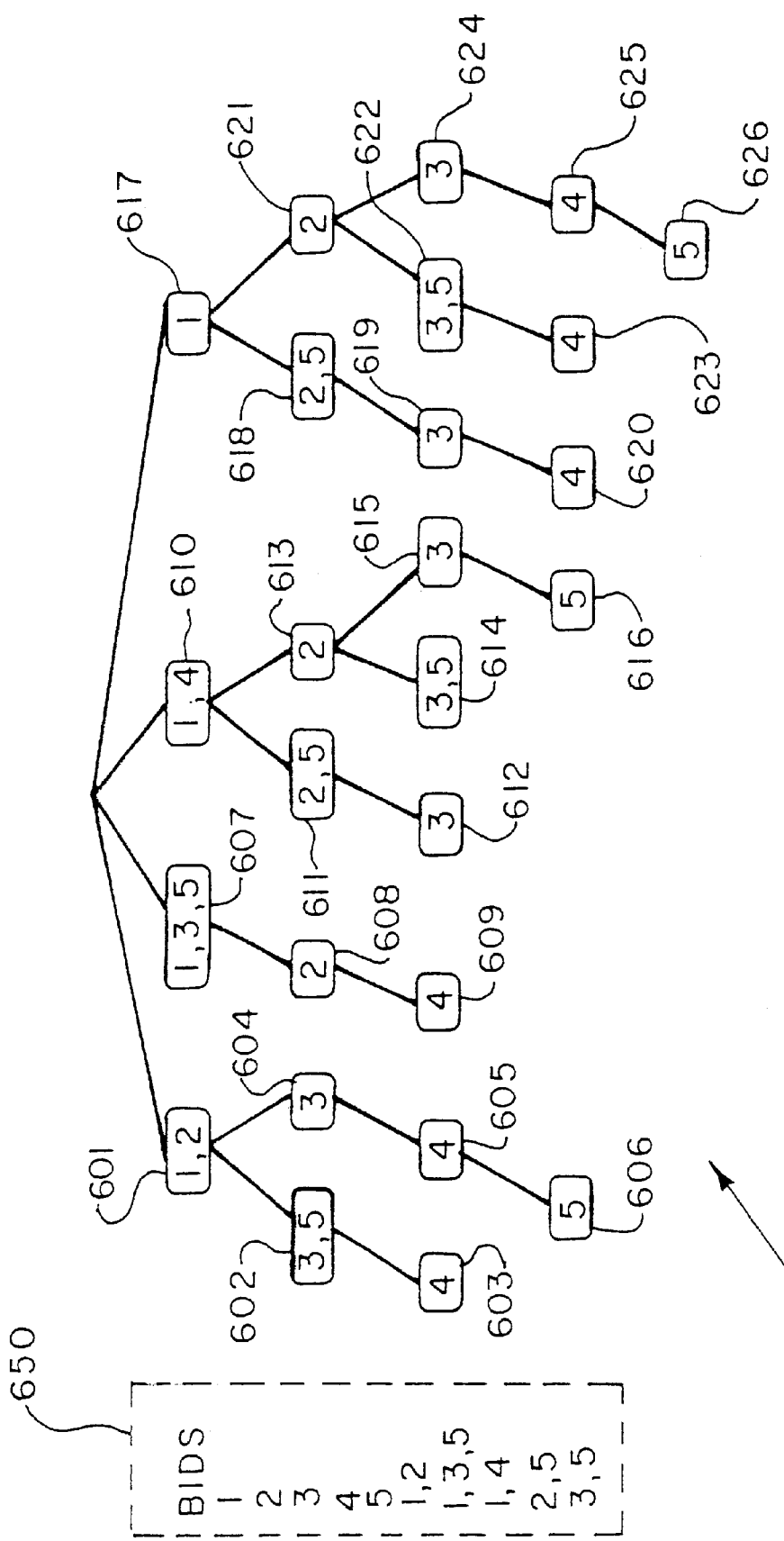
FIG. 6 depicts a second main search tree in accordance with an illustrative embodiment.

For further illustration, FIG. 6 illustrates a second main search tree 600 in accordance with an illustration embodiment. Shown in addition to the second main search tree 600 are a plurality of bids 650. A Bidtree date structure with the plurality of bids 650 having been entered is not deplicted. As can be seen with reference to the second main search tree 600, at each level, only those successor bids are generated that include the item with the smallest index among the items that have not been allocated on that path of the search tree yet. In the second main search tree 600, this can be seen, for example, at the first level because all the bids considered at the first level include item 1. Note that the minimal index does not coincide with the depth of the search tree in general. To further explain the illustrative embodiment, in FIG. 6, shown below in tabular form are the order (by reference numeral) in which the bids in the second main search tree 600 are entered the main search method 500 in the second main search tree 600.

| Order | Reference Numeral |
|---|---|
| 1 | 601 |
| 2 | 602 |
| 3 | 603 |
| 4 | 604 |
| 5 | 605 |
| 6 | 606 |
| 7 | 607 |
| 8 | 608 |
| 9 | 609 |
| 10 | 610 |
| 11 | 611 |
| 12 | 612 |
| 13 | 613 |
| 14 | 614 |
| 15 | 615 |
| 16 | 616 |
| 17 | 617 |
| 18 | 618 |
| 19 | 619 |
| 20 | 620 |

-continued

| Order | Reference Numeral |
|---|---|
| 21 | 621 |
| 22 | 622 |
| 23 | 623 |
| 24 | 624 |
| 25 | 625 |
| 26 | 626 |

In another embodiment of the invention, iterative deepening A*("IDA*") is used rather than depth-first search by the main search method. IDA* is well-known to those of skill in the art, who with knowledge of this disclosure, will quickly apprehend embodiments of the invention involving IDA*. IDA* may be used either when the main search method is used for optimal allocating search or for superset pruning as is described below. The IDA* method finds the optimal solution while typically searching less than all of the main search tree. In these embodiments, some created paths are cut before reaching the length reached using the main search method 500 as described above. Embodiments using IDA* work with a heuristic function. The heuristic function generates an overestimate of what remaining items can contrite to the total price of the allocation. With that estimate, the main search is commenced as in FIG. 5 and a running total is kept. Added to the running total is the overestimate. If the sum of the running total and the overestimate is less than a threshold, further descent on that path is halted. In one embodiment the threshold is a target price chosen by a user. If the sum of the items on a path and the overestimate is less than the target price, then it is concluded that the remainder of that path cannot lead to an allocation with a price greater than the target price and further descent on the path is halted.

If a solution is found, with a threshold, in one embodiment it is reported as the allocation. In other embodiments, or when no solution is found, the threshold is decreased. In some embodiments, the process of searching for a solution and decreasing the threshold if none is found is repeated until a solution is found.

Some embodiments using IDA* use a heuristic function that is based on the sum of the maximum contributions of the items. An item's contribution to a bid is computed as the price of the bid divided by the number of items in the bid. This quantity is evaluated for all the bids which include that item and the maximum of these selected as that item's contribution. In some embodiments, the maximum contributions of items are computed before the main search method begins.

In other embodiments, the maximum contribution is recomputed during the main search method. When a bid is allocated on the path, items in that bid will not be found in remaining bids added to the path. Restricting consideration to bids containing items not already present on the path, an item's contribution is recomputed for these bids and the maximum taken.

One of skill in the art will be able to conceive of other heuristic functions. The present invention is not limited to the particular heuristic functions herein described, but rather encompasses other heuristics which those of skill will recognize as being rapidly computable and provably overestimate what the items currently not allocated on the path can contribute.

Figure 7:
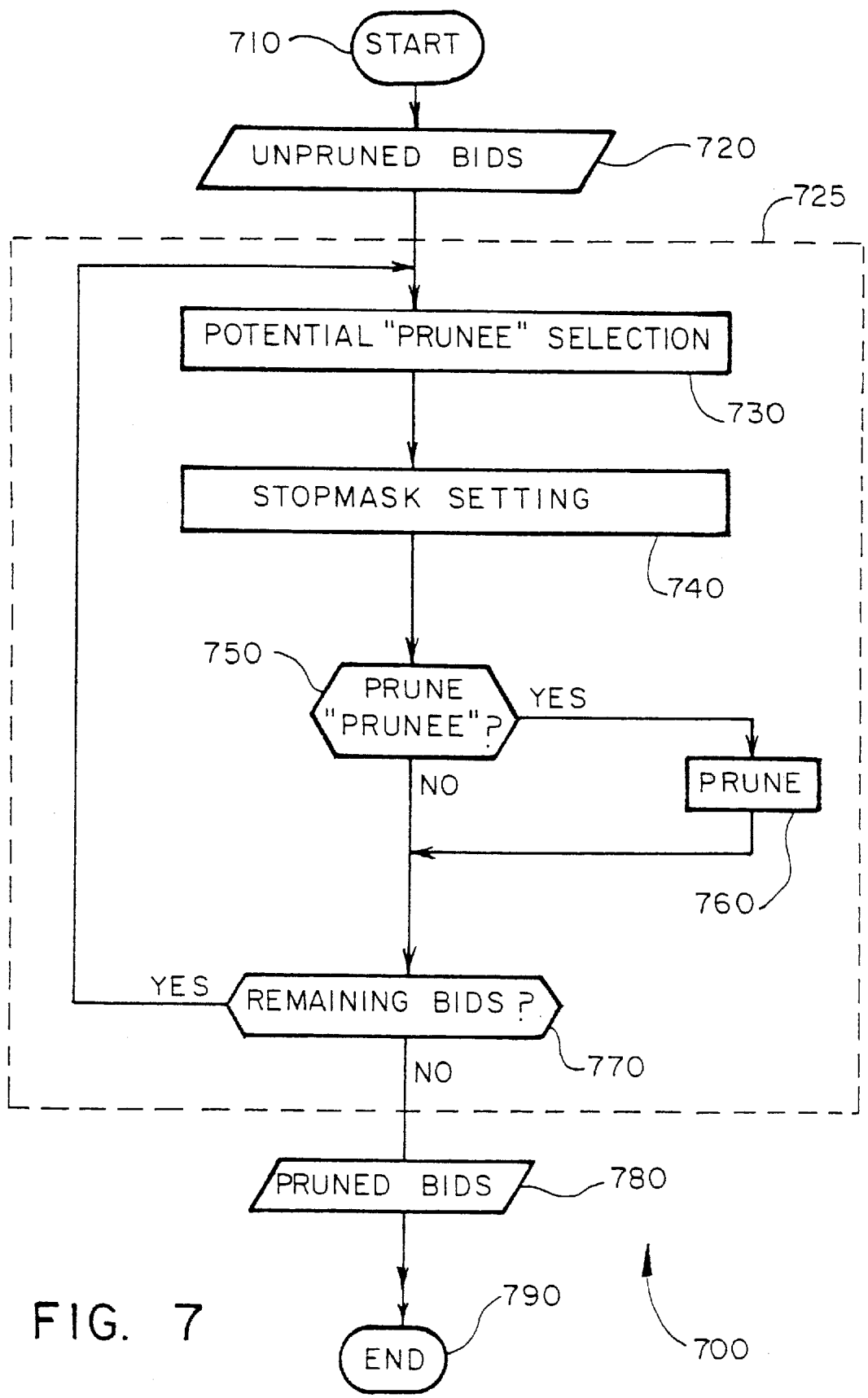
FIG. 7 depicts a 'superset prune preprocessing' procedure in accordance with an illustrative embodiment.
Figure 8:
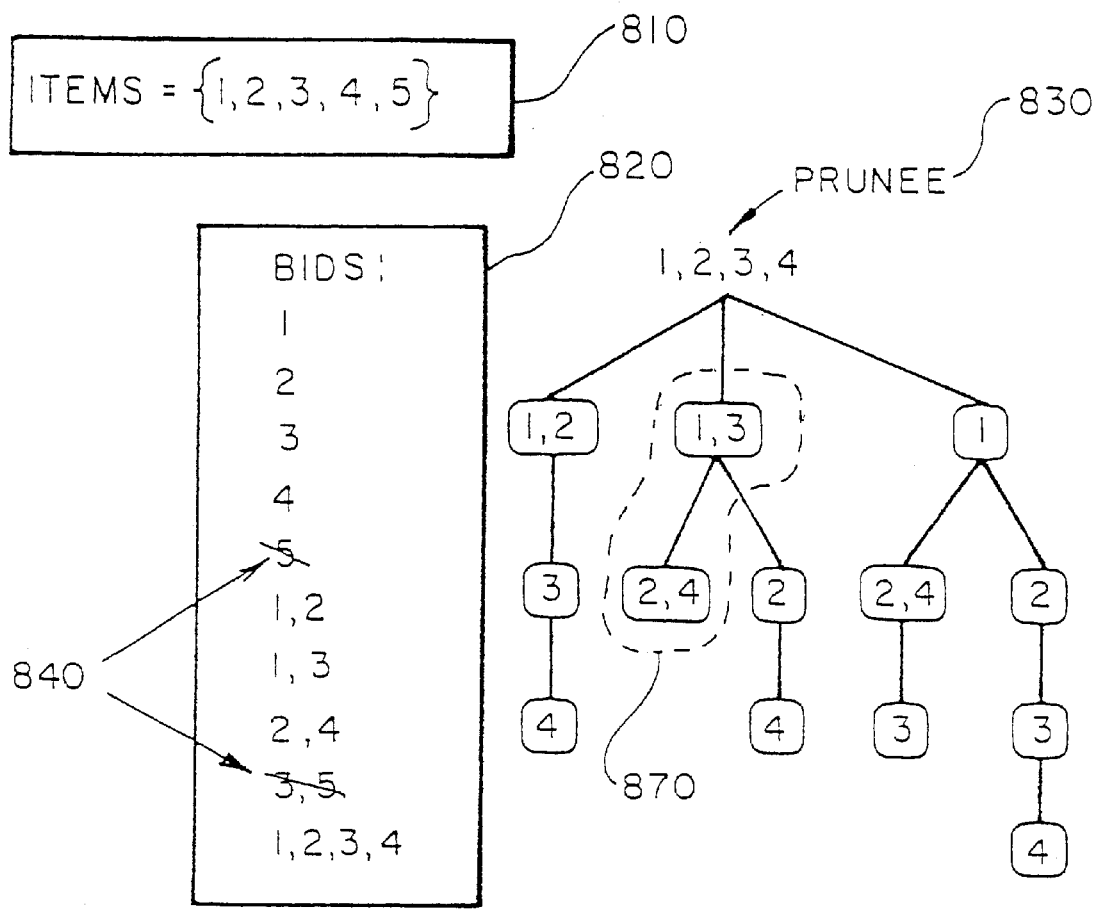
FIG. 8 depicts 'superset prune preprocessing' data in accordance with an illustrative embodiment.
Figure 8:
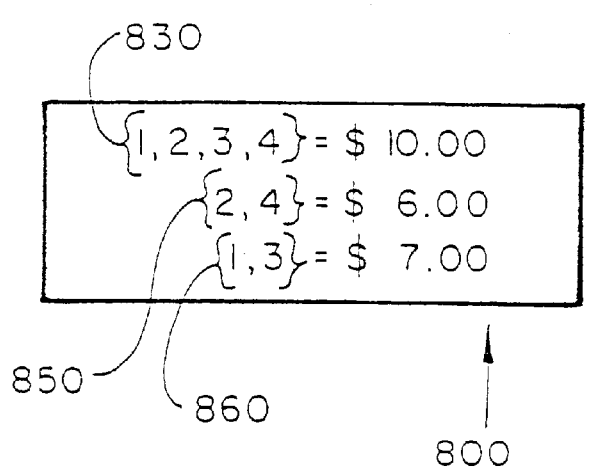

FIG. 7 illustrates a 'superset prune preprocessing' procedure 700. The 'superset prune preprocessing' procedure 700 examines the set of bids before the main search method 500 to eliminate noncompetitive bids thereby improving efficiency of the main search method 500. A bid, the potential "prunee," is noncompetitive if there is some collection of disjoint subsets of that bid's items such that the sum of the bid prices of the subsets is equal to or exceeds the price of the prunee bid. To determine this, a search is conducted for each bid (potential Prunee) through all combinations of its subset bids. The search method is fundamentally the same as in the main search, except that for the items that are not in the prunee, NOT is kept in the Stopmask data structure. This ensures that only subset bids contribute to the pruning of that bid.

Processing initiates at a 'Start' terminal 710 and continues to an 'Unpruned Bids' data block 720 to receive the collection of unpruned bids in the Bidtree. Next, a iterative block 725 is entered and a 'Potential 'Prunee' Selection' procedure 730 selects a bid from the Bidtree as a potential Prunee. Processing continues to a 'Stopmask Setting' procedure 740 that sets to 'NOT'all variables in the Stopmask data structure corresponding to items other than those in the potential Prunee bid.

Next an 'Prune 'Prunee'?' decision procedure 750 determines whether to prune the potential Prunee. To make this determination, the main search method 500 is called for the potential Prunee with the Stopmask data structure set by the 'Stopmask Setting' procedure 740.

If the main search method 500 procedure determines there is some collection of disjoint subsets of items in the bid, the sum of whose bid prices on a path exceeds the Prunee's price, the 'Prune 'Prunee'?' decision procedure 750 exits through its 'Yes' branch and processing continues to a 'Prune' procedure 760 which prunes the Bidtree data structure to remove the Prunee bid and that portion of the path from the root of the Bidtree data structure to the Prunee that leads only to the Prunee. These aspects can be seen in greater detail with reference to FIG. 8 where a non-limiting example of 'superset prune preprocessing' data 800 is depicted. Shown, are a set of items 810, of which there are five in the example: {1,2,3,4,5}. Also shown are a set of bids 820 and a Prunee 830. Bids containing items not in the Prunee 830 have had their corresponding variables in the Stopmask data structure set to 'NOT' as represented by a pair of cancellation indicia 840. As depicted, $10.00 is the bid price for the Prunee 830, $6.00 is the bid price for a first pruner 850 {2,4}, and $7.00 is the price for a second pruner 860 {1,3}. In the example, the sum of the prices for the first pruner 850 and the second pruner 860 exceed that of the Prunee 830. The first pruner 850 and the second pruner 860 correspond to a pruning path 870 in a reduced version of a main search tree that has the Prunee 830 at its root.

After the 'Prune' procedure 760, or if the 'Prune 'Prunee'?' decision procedure 750 exits through its 'no' branch, processing continues to a 'Remaining Bids?' decision procedure 770 that controls exit from the iterative block 725. If not all bids have been evaluated for potential pruning, the 'Remaining Bids?' decision procedure 770 exits through its 'yes' branch to reenter the iterative block 725. Otherwise, the 'Remaining Bids?' decision procedure 770 exits through its 'no' branch. A 'Pruned Bids' data block 780 returns a pruned Bidtree data structure and processing completes through an 'End' terminal 790.

As one skilled in the art can appreciate, preprocessing may be done only partially if a user desires to save preprocessing time. With such partial pruning, some of the noncompetitive bids are left unpruned, but that will not affect the final result of the main search; however, the main search may complete less quickly. In one embodiment preprocessing time is limited. In yet another embodiment, a cap is placed on the number of pruner bids which may be combined in an attempt to prune a particular prunee. This type of cap restricts the depth of the search. In still yet another embodiment, a cap is placed on the number of items in a prunee bid. Accordingly, in this embodiment relatively larger bids may then not be targets of pruning. This implies a cap on the tree depth but it also reduces the width of the tree.

In a further aspect of the present invention, embodiments in which a cap is placed on processing time or the number of pruner bids, may be converted to into an anytime preprocessing algorithm by starting with small caps, conducting the preprocessing, increasing the cap, reconducting the preprocessing, and repeating. The process would stop (and main search would be started) when the preprocessing is complete (cap equals the number of items), when a preset preprocessing time limit expires, or when the user decides to stop preprocessing and to move to the main search phase.

According to another embodiment of the invention, the preprocessing algorithm may be converted into an approximation algorithm by allowing pruning when the sum of the pruners' prices exceeds a fixed fraction of the prunee bid's price. This embodiment allows more bids to be pruned which can make the main search run faster. As one of skill can appreciated, this may compromise optimality because some of the bids that are pruned in this way might have been winners in the optimal allocation.

Some embodiments of the invention use IDA* with the 'superset prune preprocessing' procedure 700. According to these embodiments, the threshold is set as the prunce bid's price.

INDUSTRIAL APPLICABILITY

The present invention has applications in many areas. In one instance the invention could be used in an auction of communications bandwidth by, for example, the U.S. Federal Communications Commission (FCC).

In another instance, the invention could be used for in the market for services such as electricity. In some contexts, services such as electricity, are sold by, for example, time slots, with differing prices for different slots. The invention may be applied with a time slot as an item.

In another instance, the invention could be used in the context of trading debt or equity securities. For example, bonds with different maturities could be items and sold in combinations. In a further example, combinations of securities could be auctioned off. Such an application would be desirable, for example, when buyers have preferences over bundles instead of individual items, for example, due to covariances of the securities' returns.

Another instance where the invention may find applicability is in the context of, for example, a manufacturer, selling services. The particular tasks taken on represent combinations. Similarly, a buyer would form combinations of resources to bid upon.

Yet another instance where the invention may find applicability is in logistics. For example, in a vehicle routing situation, items could be locations to which a vehicle would be routed, or pickup/dropoff location pairs, and the vehicle purveyor would bid over combinations of locations to travel. Another example could be for the carriage of items. One desiring shipment of items may auction off the tasks in combinations to the cheapest carrier(s).

A further instance of applicability of the invention would be to airplane landing slot allocation. Landing slots could be items. In another instance, collectible commodities could be items. Others applications include determining an optimal allocation of patient treatments in different hospitals or in differing departments of one hospital. An additional application is to bidding on portions of a software development contract where an item would be a part of the software to be developed. Further, the present invention may be applied to world wide web indexing (or searching); in this application, items could be portions of the web to index (or search) and search engine operators could bid for portions to index (or search).

A still further area of applicability is where there are multiple sellers and multiple buyers and a third party acts as an auctioneer. For example, multiple sellers could offer items which are auctioned combinatorially by the auctioneer and for which buyers have preferences over combinations.

In another instance of applicability, a contractor desiring to hire subcontractors could apply the invention to determine the optimal allocation of subcontractors to employ to perform a plurality of tasks.

In a still further instance of applicability of the invention, items could be a commitment to provide a product or service over a particular time period.

The forgoing instances of applicability of the invention are only intended as illustrative. Applications of the present invention are not limited to those set forth above. Rather, while the invention has been described in terms of illustrative embodiments, one skilled in the art will understand that various modifications may be made without departing from the scope of the invention. Accordingly, the scope of the invention is not to be limited to the particular embodiments discussed herein, but should be defined only by the claims and equivalents thereof.

What is claimed is:

1. A computer-implemented method for optimally selecting sets of items and associated bids in a combinatorial auction, said computer-implemented method comprising the steps of:

receiving a plurality of sets of items having associated bids, wherein each set has no restrictions regarding the items forming said set, storing said plurality of sets and associated bids in a data structure configured for searching based on the inclusion/exclusion of items, creating candidate allocations of said sets and associated bids, said candidate allocations created by repeatedly searching said data structure for a set wherein successive searches exclude sets having items already present in said candidate allocation, and selecting a candidate allocation comprising disjoint sets having an optimal combination of associated bids.

2. The computer-implemented method according to claim 1 further comprising removing one or more of said sets of items and associated bids stored in said data structure wherein said one or more sets of items and associated bids are selected for removal based on their associated bids being dominated by a combination of bids of other sets of items stored in said data structure and wherein items in said other sets of items are disjoint subsets of items in said removed sets of items.

3. The computer-implemented method according to claim 1 wherein said data structure is repeatedly searched using an iterative-deepening A* search.

4. The method of claim 3 wherein a heuristic used is based on a maximum bid contribution of items determined by (a) computing for each bid each item's contribution to said bid by dividing the value of said bid by the number of items in the bid, and (b) associating each item with the maximum value computed therefor in step (a).

5. The method of claim 4 wherein said maximum bid contribution is recomputed every time a set is added to a candidate allocation.

6. A computer-implemented method for maximizing the aggregate value of sets of individual items and individual values therefor in a combinatorial auction, said method comprising the steps of:

(a) receiving as input to the computer a plurality of bids, wherein each bid is a set of one or more items with associated prices and each bid has no restrictions regarding the items forming the set;

(b) pruning the bids in the computer to remove dominated bids;

(c) generating in a storage of the computer from the remaining bids a bidtree of the remaining bids, and a stopmask array, wherein the stopmask array is a vector with one variable for each item;

(d) inserting dummy bids into the array of bids in storage for all single items for which there are not already bids, and assigning these dummy bids a price of 0;

(e) examining the bids individually in the computer to determine whether there are combinations of disjoint subsets of the items in the bid, the sum of whose bid prices is greater than, or equal to, the bid, and pruning those bids; and (f) conducting a main search to determine a maximum aggregate value allocation to maximize revenue from the auction.

7. The method of claim 6 further comprising pruning bids that are dominated in the sense that there is some set of other bids, each of which other bids only contains items included in the pruned bid, the other bids do not share items, and the sum of the prices of those other bids is higher or equal to the bid price of the pruned bid.

8. The method of claim 7 further comprising using only items included in the bid to be pruned wherein if the tally of prices on a search path is greater or equal to the price of the bid to be pruned, the bid intended to be pruned is deleted.

9. The method of claim 6 comprising setting one or more variables in the stopmask array to "ANY" for items included in the bid intended to be pruned, and to "NOT" for items that are not included in the bid intended to be pruned.

10. The method of claim 6 wherein the array of remaining bids in storage is a binary tree with one level for each item in the auction, and bids are represented as leaves of the binary tree, where the inclusion of an item in a bid corresponds to a first direction of branching at the level of the tree corresponding to that item, and the exclusion of an item corresponds to a second direction of branching at the level of the tree corresponding to that item, wherein the method comprises following inclusion branches at levels corresponding to items in the bid and exclusion branches at levels corresponding to items not in the bid.

11. The method of claim 10 wherein each of the variables of the stopmask array takes a value of "NOT", "MUST" and "ANY", where "NOT" indicates that a search of the bidtree should not follow branches including the item, "MUST" indicates that a search of the bidtree should follow all branches that include the item, and "ANY" means no restrictions are placed on the search with respect to the item.

12. The method of claim 11 comprising conducting a main search by carrying out the steps of:

carrying out a depth first search of the bidtree using the stopmask array for bids to add to a main search tree; and (1) determining if an existing bid structure of the main search tree is the best allocation price;
(a) if so, updating the best allocation price and terminating the search; and
(b) if not, terminating the search; or
(2) entering a bid in the storage.

13. The method of claim 12 comprising alter entering a bid in the storage, resetting the stopmask in the storage in accordance with the bid and doing one of:
(a) searching the bidtree for a next node;
(b) backtracking and searching the bidtree for a sibling node; or
(c) exiting.

14. The method of claim 12 comprising the steps of:
(a) initializing the first element of the stopmask data structure to "MUST";
(b) initializing the remaining elements of the stopmask data structure to "ANY"; and
(c) conducting a depth first search of the bidtree.

15. A system comprising one or more computers controlled to maximize the aggregate bid value of sets of individual items and individual values therefor in a combinatorial auction, said system controlled to:
(a) receive a plurality of bids, wherein a bid is a set of one or more items with associated prices and said set has no restrictions regarding the items forming it;
(b) prune the bids to remove dominated bids;
(c) generate a bidtree of bids, and a stopmask array of remaining bids;
(d) insert dummy bids into the bidtree for all single items for which there are not already bids, and assigning these dummy bids a price of 0;
(e) examine the bids individually to determine whether there are combinations of disjoint subsets of the items in the bid, the sum of whose bid prices is greater than, or equal to, the bid, and pruning those bids from the array; and
(f) conduct a main search to determine a maximum aggregate value allocation.

16. The system of claim 15 wherein the bidtree of remaining bids is a binary tree with one level for each item in the auction and bids are represented as leaves of the binary tree, where the inclusion of an item in a bid corresponds to a first direction of branching at the level of the tree corresponding to that item, and the exclusion of an item corresponds to a second direction of branching at the level of the tree corresponding to that item, wherein the system is controlled to follow inclusion branches at levels corresponding to items in the bid and exclusion branches at levels corresponding to items not in the bid.

17. The system of claim 16 wherein the stopmask array is associated with a stopmask data structure, said stopmask data structure having one variable for each item in the auction, each of the variables taking a value of "NOT", "MUST" and "ANY", where "NOT" indicates that a search of the bidtree should not follow branches including the item, "MUST" indicates that a search of the bidtree should follow all branches that include the item, and "ANY" means no restrictions are placed on the search with respect to the item.

18. The system of claim 17 wherein the system is controlled to conduct a main search by carrying out the steps of:
carrying out a depth first search of the bidtree using the stopmask array for bids to add to a main search tree; and
(1) determining if an existing bid structure of the main search tree is the best allocation price;
(a) if so, updating the best allocation price and terminating the search; and
(b) if not, terminating the search; or
(2) entering the bid.

19. The system of claim 18 wherein, after entering the bid, the system is controlled to reset the stopmask in accordance with the bid, and is further controlled to:
(a) search the bidtree for a next node;
(b) backtrack and searching the bidtree for a sibling node; or
(c) exit.

20. The system of claim 18 wherein the system is controlled to:
(a) initialize the first clement of the stopmask array to "MUST";
(b) initialize the remaining elements of the stopmask array to "ANY"; and
(c) conduct a depth search of the bidtree.

21. A computer implemented method for determining a winning bid or a winning combination of bids in a combinatorial auction, said method comprising the steps of:
(a) receiving a plurality of bids, wherein each bid is a set of one or more items with an associated value and each bid has no restrictions regarding the items forming the set;
(b) creating candidate allocations of said sets, each candidate allocation comprised of a unique set or a unique union of disjoint sets and a combination of the associated values of each set of the candidate allocation; and
(c) selecting the candidate allocation comprising the unique set or the unique union of disjoint sets having an optimal combination of associated values.

* * * * *

UNITED STATES PATENT AND TRADEMARK OFFICE
CERTIFICATE OF CORRECTION

PATENT NO. : 6,272,473 B1
DATED : August 7, 2001
INVENTOR(S) : Tuomas Sandholm

It is certified that error appears in the above-identified patent and that said Letters Patent is hereby corrected as shown below:

Column 6,
Lines 25-26, "an sixth" should read -- a sixth --.

Column 8,
Line 23, "can appreciated" should read -- can appreciate --.
Line 65, after "550" insert -- is --.

Column 10,
Line 9, "is replaces" should read -- it replaces --.
Line 14, "its priced" should read -- its price --.

Column 11,
Line 29, "illustration" should read -- illustrative --.
Line 31, "A Bidtree date" should read -- A Bidtree data --.
Line 32, "not deplicted." should read -- not depicted. --
Lines 42-43, "(by reference numberal)" should read -- (by reference numeral) --.
Line 44, after "are entered" insert -- by --.

Column 12
Line 17, "allocating" should read -- allocation --.
Line 15, "contrite to" should read -- contribute to --.

Column 13,
Line 15, "Next, a iterative" should read -- Next, an iterative --.
Line 22, "Next an" should read -- Next a --.

Column 14,
Line 12, after "converted to" delete "into".
Line 26, "can appreciated" should read -- can appreciate --.
Line 39, "use for in" should read -- used in --.

UNITED STATES PATENT AND TRADEMARK OFFICE
CERTIFICATE OF CORRECTION

PATENT NO.    : 6,272,473 B1
DATED         : August 7, 2001
INVENTOR(S)   : Tuomas Sandholm It is certified that error appears in the above-identified patent and that said Letters Patent is hereby corrected as shown below:

<u>Column 17</u>,
Line 17, "alter" should read -- after --.
Line 45, after "in the auction" insert comma (,).

Signed and Sealed this

Thirtieth Day of April, 2002

Attest:

JAMES E. ROGAN
*Attesting Officer*   *Director of the United States Patent and Trademark Office*